(12) United States Patent
Colsman et al.

(10) Patent No.: US 11,805,943 B2
(45) Date of Patent: Nov. 7, 2023

(54) GRILLING APPLIANCE

(71) Applicant: Enders Colsman AG, Werdohl (DE)

(72) Inventors: Robin Colsman, Dortmund (DE);
Michael Gloger, Werdohl (DE)

(73) Assignee: Enders Colsman AG, Werdohl (DE)

( * ) Notice: Subject to any disclaimer, the term of this patent is extended or adjusted under 35 U.S.C. 154(b) by 312 days.

(21) Appl. No.: 17/201,990

(22) Filed: Mar. 15, 2021

(65) Prior Publication Data

US 2021/0282591 A1 Sep. 16, 2021

(30) Foreign Application Priority Data

Mar. 16, 2020 (DE) .................... 20 2020 101 426.9

(51) Int. Cl.
*A47J 37/07* (2006.01)
(52) U.S. Cl.
CPC ......... *A47J 37/074* (2013.01); *A47J 37/0713* (2013.01)
(58) Field of Classification Search
CPC .. A47J 37/074; A47J 37/0713; A47J 37/0611; A47J 2037/0617
See application file for complete search history.

(56) References Cited

U.S. PATENT DOCUMENTS

| | | | |
|---|---|---|---|
| 2010/0206180 A1 | 8/2010 | Ricchio et al. | |
| 2014/0161953 A1* | 6/2014 | Jones | A47J 37/0611 426/523 |
| 2016/0037967 A1 | 2/2016 | Glavan et al. | |

FOREIGN PATENT DOCUMENTS

| | | |
|---|---|---|
| AT | 374673 B | 5/1984 |
| DE | 7735481 U1 | 3/1978 |
| DE | 202016106109 U1 | 2/2018 |
| DE | 102017220645 A1 | 5/2019 |
| DE | 202019104770 U1 | 9/2019 |
| EP | 2965673 A1 | 1/2016 |
| WO | 2014012062 A2 | 1/2014 |

OTHER PUBLICATIONS

Extended European Search Report dated Jul. 20, 2021 in related European application 21162213.9.
Examination report dated Apr. 28, 2023 in related European application No. 21162213.9.
Examination report dated May 15, 2023 in related European application No. 23168420.0.

* cited by examiner

*Primary Examiner* — Alfred Basichas
(74) *Attorney, Agent, or Firm* — POLSON INTELLECTUAL PROPERTY LAW, PC; Christopher Sylvain; Margaret Polson (57) ABSTRACT

A grilling appliance with a grilling surface for placing food to be cooked, with a heat source located below the grilling surface for heating a food item on the grilling surface and with a second heat source located above the grilling surface. The second heat source is adjustable in such a way that it can be used to heat a food item located on the grilling surface from the side and/or from above, depending on the position of the second heat source, in that the second heat source is retained on a rear wall of the grilling appliance that extends beyond the top of the grilling surface so as to be translationally height-adjustable, and in that the second heat source can be pivoted about a pivot axis, in order to adjust the direction of the desired heat radiation downward between a position for releasing heat in a horizontal direction and a position for releasing heat in a vertical direction.

16 Claims, 5 Drawing Sheets

GRILLING APPLIANCE

BACKGROUND

The present disclosure relates to a grilling appliance with a grilling surface for placing food to be cooked, with a heat source located below the grilling surface for heating food on the grilling surface and with a second heat source located above the grilling surface. Such grilling appliances are commonly referred to simply as grills in the United States.

Such grilling appliances are designed, for example, as gas grilling appliances. In such a grilling appliance, a burner is located below the grilling surface as a heat source for heating food on the grilling surface. The grilling surface itself is typically designed as a grate. With such grilling appliances, the heat source of which can also be an electrical heat source or a heat source provided by burning coal, the product located on the grilling surface is grilled. Gas grilling appliances are typically burner tubes that are arranged below the grilling surface.

With such grilling appliances, sometimes there is also the option of attaching a spit rotisserie, typically driven by an electric motor, to the two opposite transverse side walls. When using the gas grilling appliance in this way, a drip tray or a drip pan for collecting cooking liquids is positioned below the food on the spit rotisserie. Liquids that drip down should not contaminate the burner tubes located below the cooking surface. For this reason, it is not possible to heat food on a spit rotisserie using the usual burner tubes located below the grate. With such a gas grilling appliance design, it has a back burner, often referred to as a backburner. This back burner is connected to the rear wall of a housing enclosing the cooking space and is thus positioned laterally with respect to the cooking space. This means that the back burner is located laterally in relation to a spit rotisserie, so that the heat supplied to the food is supplied from the rear side of the grill chamber and thus from a different direction than from below. With such a back burner, food held on a spit rotisserie can be cooked without liquids being able to drip onto the back burner. Due to the drip tray or drip pan positioned below the spit rotisserie, the burner tubes located underneath a grate cannot get dirty either.

Such a grilling appliance is known from DE 20 2019 104 770 U1. In this previously known grilling appliance, which is designed as a gas grilling appliance, the second heat source is designed as a gas-powered heat source, in which the flames emerging from a burner tube when the second heating unit is in operation act on a red incandescent body with a flat extension, which is arranged with at least one section in its vertical extension of its surface, so that, during operation of the burner tube, the flames generated thereby act on this surface or the surface is impacted by a flow of rising hot exhaust. In this previously known gas grilling appliance, a stationary burner tube is provided. The red incandescent body can be influenced within certain narrow limits with regard to the direction of radiation of the heat. The second heat source described in this prior art is used when a spit rotisserie is to be cooked with the grill.

However, the adjustability of the red incandescent body is limited, since, for the operation thereof, the flames of the burner tube act on its surface facing the grilling surface or the surface is impacted by the escaping flow of hot exhaust gases.

Another grilling appliance, which has a second heat source in addition to a heat source arranged below the grilling surface, is known from DE 10 2017 220 645 A1. This grilling appliance can also be designed as a gas grilling appliance. The second heat source serves as a top heat source and is designed as a high-temperature heat source. This provides the function of a broiler or so-called "Beefer" in German, that is: grilling a steak from above at a high temperature. The top heat source is located on an arm, with which it can be pivoted, in order to adjust the distance away from the food to be cooked with top heat. Due to the arm retaining the top heat source, it is located above different areas of the grilling surface, depending on its height-setting device.

SUMMARY

Proceeding from this background, an aspect of the present disclosure is to propose a grilling appliance with the second heat source thereof allowing a more variable use.

This is achieved by a generic grilling appliance of the type mentioned at the outset, in which the second heat source is adjustable in such a way that it can be used to heat food located on the grilling surface from the side and/or from above, depending on the position of the second heat source, wherein the second heat source is retained on a rear wall of the grilling appliance that extends beyond the top of the grilling surface so as to be translationally height-adjustable, and wherein the second heat source can be pivoted about a pivot axis, in order to adjust the direction of the desired heat radiation downward between a position for releasing heat in a horizontal direction and a position for releasing heat in a vertical direction.

In this grilling appliance, the second heat source can be adjusted in such a way that it can heat food on the grilling surface from the side and/or from above or in positions between these two positions. A position of the second heat source is typically provided in which it can heat food from the side or from above. It is also entirely possible to fix the second heat source in an intermediate position so that food is heated diagonally from above. In such a position, one side of the food as well as its top is heated. Lateral heating can be provided, for example, when food is lying on the grilling surface and is to be heated from the side solely or in addition to heating from below, or if a spit rotisserie is arranged above the grilling surface. The second heat source is then typically fixed in a slightly raised position. Since this grilling appliance also has a heat source below the grilling surface, food located on or above the grilling surface can be heated from below and from one side or from above at the same time. Of course, food can also be heated with just the second heat source. In one example embodiment, it is provided that the second heat source can also be operated as a high-temperature heat source, and thus the second heat source, when it is in its position to heat food from above, can be used as a so-called "Beefer." If the second heat source is provided as a "Beefer," it is useful if the height adjustment of same is infinitely variable or can be set in several stages as relates to the grilling surface, in order to configure the distance between the second heat source with its heat-emitting side and the food. Typically, in its "Beefer" function, the second heat source is arranged only a very short distance away from the food to be cooked. However, the second heat source does not necessarily have to be designed as a high-temperature heat source. If the second heat source is designed as a high-temperature heat source, it can also be operated at a lower operating temperature if it is not to be used as a "Beefer."

For the adjustability of the second heat source, it is retained with height adjustment as relates to a rear wall extending over the top of the grilling surface. The second heat source is adjusted in the vertical direction by means of a translational movement. With this grilling appliance, the second heat source therefore remains a constant distance away from the rear wall due to its height adjustability on the rear wall of the grilling appliance, regardless of the height position set. Therefore, the second heat source can be configured in its lowered position to discharge heat at the level of the grilling surface in the horizontal direction. In a middle or a raised position, the second heat source is used, in its position for horizontal heat emission, for example to heat food on a spit rotisserie. Furthermore, the second heat source can be pivoted about a pivot axis, by means of which its heat radiation direction can be adjusted. The pivot axis of the second heat source is preferably arranged eccentrically with respect to this, namely offset towards the lower end of the second heat source when it is in its position for lateral heat emission. The second heat source can thus be pivoted about this eccentric pivot axis, which is typically arranged in the area of the lower edge of the second heat source in this position. The second heat source is guided and retained, with its pivot axis adjustable in height, on the rear wall of the grilling appliance. Such an arrangement of the pivot axis has the advantage that it can be arranged in the immediate vicinity of the rear wall of the grilling appliance. Thus, the lever arm, with which the weight of the second heat source acts on the guide and/or retainer of same in or on the rear wall, is therefore correspondingly small. At the same time, this ensures that the second heat source, in its position for lateral heat emission, only takes up a small area of the grilling surface. To heat a food item from above, the position of the second heat source does not change due to the separation of its height adjustability and its pivotability with respect to the heat-irradiated area of the grilling surface, apart from the fact that, from a higher position of the second heat source, a larger area of the grilling surface is radiated by heat with a heat emission downwards.

The separation of the height adjustability of the second heat source from its pivotability provides the particularly variable use of the second heat source, because it can be brought into various positions for heat emission in different directions without the need for extensive adjustment mechanisms.

A height adjustment of the second heat source with respect to the rear wall can be realized in a simple manner, for example by slot-like guides, which are preferably arranged adjacent to the side closures of the second heating unit in order to prevent the depth of the second heat source from becoming unnecessarily large with the guidance thereof. Positioning arms can be guided in these guides, one section of which extends through the guide and carries the means for pivoting the second heat source at the end protruding from the inside of the rear wall in the direction of the grilling surface. This can be, for example, a rod or a pipe section around which the second heat source can be pivoted. The penetration of the positioning arms through the rear wall also has the advantage that, for example with manual height adjustment, a person performing the height adjustment can do this from the rear side of the rear wall and, for this purpose, does not need to access the hot zone above the grilling surface when the grill is in operation. At the same time, these slot-like guides can be used to clamp the positioning arms thereto, especially when they are reinforced along their length and thus following the longitudinal extension thereof. Height adjustability, like pivotability of the second heat source, can also take place by an electric motor, typically with the interposition of a self-locking gear. In this case, further fixing means are basically not required for fixing the height and pivot position that has been configured.

In one example embodiment, the eccentric arrangement of the pivot axis of the second heat source is used so that the second heat source is retained in a stable position in its two end positions solely by stops. For the position of the second heat source in an alignment as relates to the horizontal heat emission, this can be done, for example, by a position of same, which can be considered the over-center position. To this end, it is only necessary that the second heat source is supported in this over-center position on a stop, for example on the inside of the rear wall. The other setting can also be limited by a stop. This can be done, for example, by means of a support extension that acts against the inside of the rear wall when the second heat source is in its position intended for vertical heat emission.

The second heat source is preferably a heat source designed at least as a high-temperature heat source. Typically, it is designed as an IR radiator. Such an IR radiator can be gas-operated, which is particularly useful if the heat source located below the grilling surface is also a heat source which is operated with fuel gas. In such a case, a pipe section supplying the fuel gas to the second heat source can also represent the pivot axis on one side of the second heat source, the pipe section remaining stationary, while the second heat source can be pivoted around this pipe section as a fixed pivot axis. The second heat source can also be an electrically operated heat source. A design of the second heat source as an electrically operated IR radiator can also be provided if the first heat source, which is provided for heating food located on the grilling surface from below, is gas-operated.

A particular advantage of such a grilling appliance is that the second heat source can be implemented with simple means and inexpensively, especially with regard to its connection to the other components of the grilling appliance.

In one embodiment of such a grilling appliance, it is provided that the second heat source has positioning arms which extend through the guides or the guide slots in the rear wall and are guided in guides arranged on the rear side with respect to the rear wall. Furthermore, the second heat source is suspended or held in a weight-compensated manner, so that only a small moment of force has to be expended to adjust the height of the second heat source. In this respect, a weight-compensating counterforce acts on the positioning arms in such a design of the grilling appliance. The second heat source is retained or fixed in its desired height-setting device by a retaining means, which may be the system friction of the components used for adjusting the second radiant heater. With such a weight-compensating counterforce, the second radiant heater can be adjusted with little force, even if a mechanical translation is provided between an actuator, for example a manually operated control element, and the actual adjustment movement of the second heat source.

Such a counterforce can be provided by one or more spring elements. At least one spiral spring is preferably used to provide the counterforce, since this provides a constant or approximately constant spring force via its adjustability. A force transmission from such a spiral spring to the positioning arms of the second heat source takes place, for example, via cables, such as Bowden cables or the like. According to one example embodiment, such a spiral spring sits in a spring housing designed as a cable pulley and is pretensioned therein. In this way, within the scope of the vertical adjustment amount of the second heat source, a largely equal counterforce is provided by the latter, independently of the height adjustment of same. Cables are connected to the cable pulley in order to transmit a rotary movement of the cable pulley to the positioning arms for the vertical adjustability thereof. They are typically guided by deflection pulleys. In order to ensure that the cable is guided without jamming, cable guide grooves are made in the outer surface of the cable pulley. These grooves extend in a spiral around the axis of rotation of the cable pulley if the cable pulley should be adjusted by more than 360° for each connected cable.

This embodiment of a grilling appliance allows a manually operable control element, even one that is designed as a rotary knob, to be used to adjust the height of the second heat source despite its weight. Such a rotary knob is typically arranged on the operating side of the grilling appliance together with the other operating elements. The rotational movement carried out therewith is transmitted from such a manually operable control element to the cable pulley via a Bowden cable, for example. In such an example embodiment, the cable pulley is driven to adjust the second heat source by actuating the operating element.

It is also entirely possible to design a grilling appliance, as described above, in which, in addition to the cable pulley with its spiral spring, a further spiral spring is provided as part of the manually operated control element, for example if higher weights of the second heat source are to be compensated.

The pivotability of the second heat source can also be designed in the same way, namely that a positioning-force-reducing moment of force acts on it. This can also be provided by one or more spiral springs for weight compensation. Such a spiral spring can be part of the manually operated control element. With regard to the pivotability of the second heat source, one example embodiment provides for the actuating force to be transmitted to the second heat source by means of at least one cable, typically a Bowden cable.

The weight-compensated suspension of the second heat source in terms of its height adjustability and/or the effect of a positioning-force-reducing moment of force on the pivotability of the second heat source, when manual operation should not be provided, also has the advantage that adjustability is possible, for example, also with an electrically operated actuator, typically an electric motor. In order to achieve the desired adjustability in spite of the existing weight of the second heat source, it is then completely sufficient if a low-power and thus a low-energy-consuming electric motor is used.

The embodiment of a grilling appliance described above, which is also described below with reference to figures, in which the height adjustability and/or pivotability is provided in a weight-compensated manner or in an positioning-force-reducing manner, can also be used in grilling appliances in which the second heat source is not in the embodiment specifically claimed or when another component of the grilling appliance is to be adjusted within the cooking space.

BRIEF DESCRIPTION OF THE DRAWINGS

The following description is provided using example embodiments with reference made to the attached figures, wherein.

DETAILED DESCRIPTION

Figure 1:
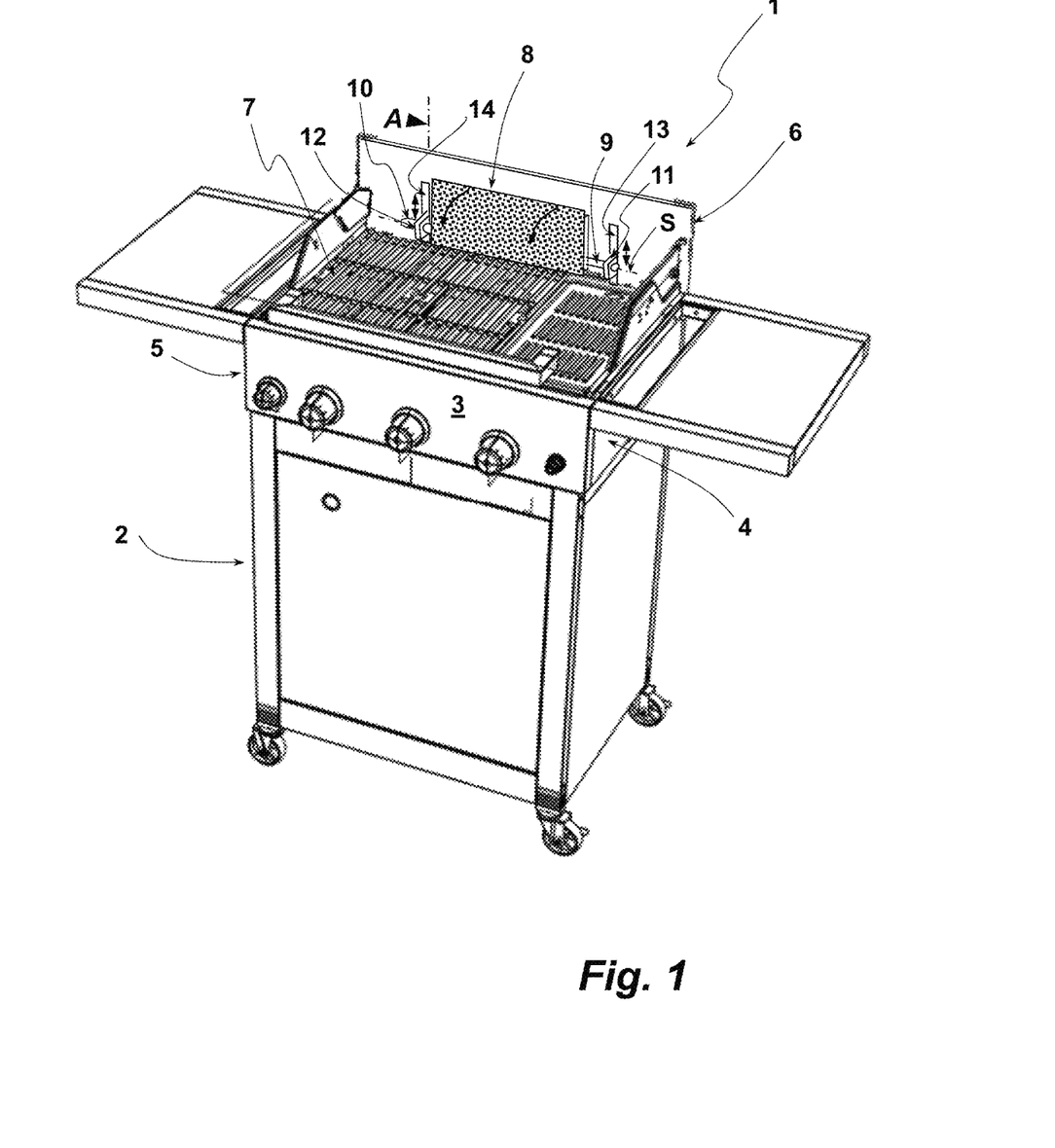
FIG. 1 shows a gas grilling appliance in a perspective view with the hood removed.
Figure 2:
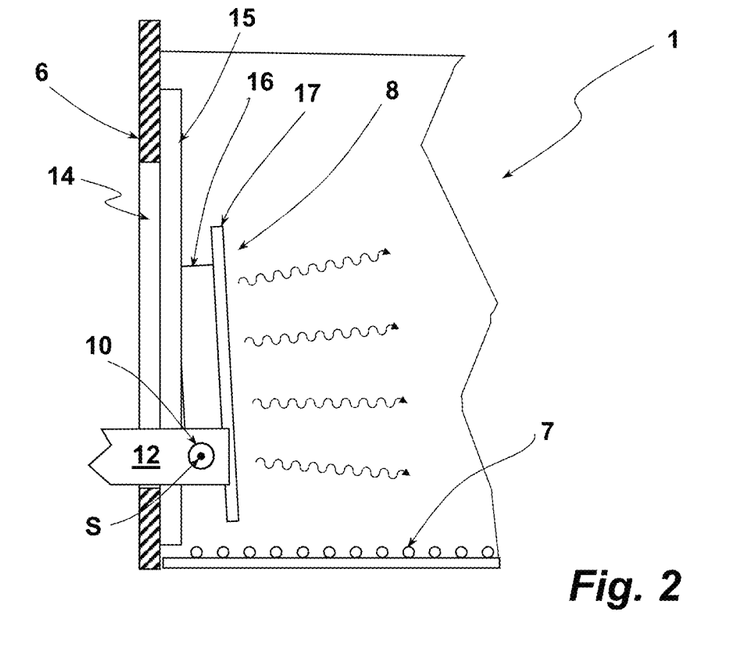
FIG. 2 shows a cross-section through the rear wall of the gas grilling appliance from FIG. 1 along sectional line A indicated in FIG. 1, with a second heat source retained on the rear wall in a first position.
Figure 3:
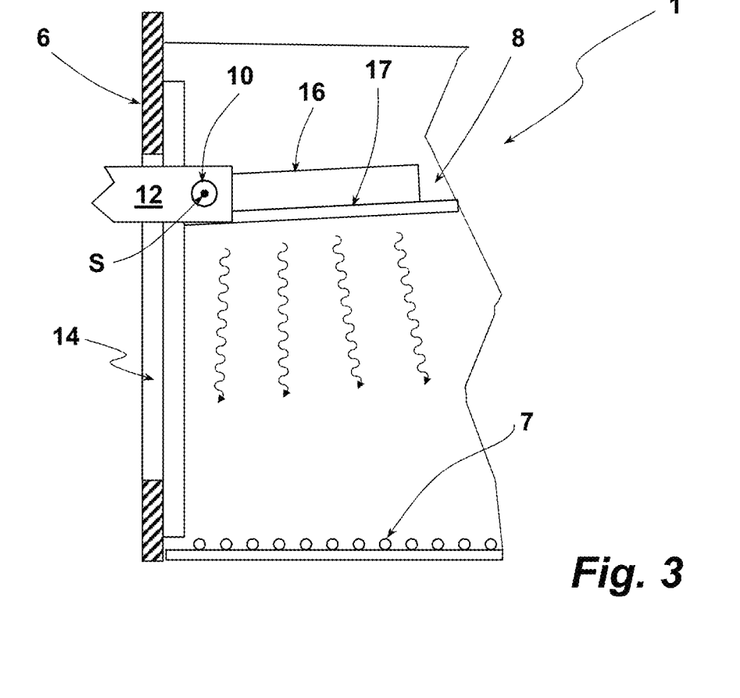
FIG. 3 shows a cross-section through the rear wall of the gas grilling appliance from FIG. 1 along sectional line A indicated in FIG. 1, with a second heat source retained on the rear wall in a further position.

In the example embodiment shown in FIGS. 1 to 3, a gas grilling appliance 1 is described, which is located on a mobile substructure 2. A burner chamber, in which several burner tubes are arranged, is surrounded by a front wall 3, two side walls 4, 5, and a rear wall 6. The burner gas supply to the burner tubes is located within the substructure 2. The burner chamber in which the burner tubes are located is delimited on the top by a grilling surface 7, which is designed as a grate in the example embodiment shown. In the example embodiment shown, the grilling surface 7 is a combination of an open grill grate and a closed grill grate (right part of the grilling surface). The closed grate is therefore a grilling plate. The grilling surface 7 is used to cook food situated thereon with a supply of heat from below when one or more of the burner tubes located below the grilling surface 7 are in operation.

In addition to the heat source located below the grilling surface 7, provided by the burner tubes mentioned, the gas grilling appliance 1 has a second heat source 8. The second heat source 8 is also a gas-operated heat source. It is designed as an IR radiator, in which a metal knitted fabric is brought into a red-glowing state by the fuel gas in the example embodiment shown, when there is corresponding firing. In FIG. 1, the second heat source 8 is in a position which extends approximately parallel to the rear wall 6. The heat-emission side thereof is aligned in this position to discharge heat in the horizontal direction. In this position, the second heat source 8 can be used as a back burner. A food item located on the grilling surface 7 can thereby be heated from the side. The second heat source 8 can just as well be used in this position to heat a spit rotisserie held on the gas grilling appliance 1 from the side, while a drip pan is positioned below the food held on the spit rotisserie to collect dripping cooking liquid. The pivot axis S of the second heat source 8 is provided by two pivot axis pieces 9, 10. The pivot axis pieces 9, 10 and thus the pivot axis S, about which the second heat source 8 can be pivoted, are located in the area of the lower end of this heat source 8, in its position shown in FIG. 1. As indicated by the arrows in FIG. 1, the second heat source 8 can be pivoted from its position shown in FIG. 1 with its heat-emission side in the direction of the grilling surface 7 (see FIG. 3).

The pivot axis pieces 9, 10 are each retained in a positioning arm 11, 12. The positioning arms 11, 12 each extend through a slot-like guide opening 13, 14 in the rear wall 6.

In the position shown in FIG. 1, the second heat source 8 is in its lowest position. The second heat source 8, as indicated by the arrows in FIG. 1, can be adjusted in height in relation to the grilling surface 7 via the positioning arms 11, 12. The positioning arms 11, 12 are fixed at the desired height position of the second heat source 8 on or in the rear side of the rear wall 6, for example by clamping means (not shown in the figures).

The pivot axis piece 9 is designed as a pipe piece, the cavity of which is continued in the positioning arm 11, which also has a hollow channel. The positioning arm 11 with the pivot axis piece 9 connected thereto is used to supply gas to the second heat source 8. A flexible gas hose is connected to the positioning arm 11 behind the rear wall 6, through which gas hose the height adjustability within the guide openings 13, 14 is not impaired.

FIG. 2 shows the second heat source 8 in its position for horizontal heat emission, in a schematic sectional view through the rear wall 6, in the region of the longitudinal extension of the guide opening 14. The positioning arm 12 extends through the guide opening 14. The two longitudinal edges of the guide opening 14 are each reinforced by a sheet-metal strip 15. The guide opening 13 has corresponding reinforcing strips. They serve the purpose that the second radiant heater 8 can be mechanically fixed on the rear wall 6 with its positioning arms 11, 12. The fixing of the second radiant heater 8 on the rear wall 6 in relation to its desired height position is not shown in the figures. For example, a clamp can be used, by means of which the rear wall 6 is clamped with its sheet-metal strips 15 serving as reinforcement.

The second heat source 8 is in its position for horizontal heat emission, which is in an over-center position, as can be seen from FIG. 2. With its rear housing 16, the second heat source is supported on the side of the rear wall 6 facing the grilling surface 7 (due to the line of intersection behind the reinforcing strip 15). The second heat source 8 is thus retained in this position without additional fixing means for fixing its pivot position. When the second heat source 8 is in operation, it emits heat in the horizontal direction, as indicated in FIG. 2. In this way, a food item located on the grilling surface 7 or a food item located on a spit rotisserie can be heated (grilled) from the side. Because it can be adjusted in height, the second heat source 8 can also be brought into a higher position for heating food on a spit rotisserie.

FIG. 3 shows the second heat source 8 in a position raised and pivoted in relation to its position in FIG. 2. In this position, the second heat source 8 is used to supply heat to a food item to be cooked on the grilling surface 7 from above. The second heat source 8 has been pivoted about the pivot axis S. Since the second heat source 8 is also designed for high-temperature operation, it can also be used as a "Beefer" in the position shown in FIG. 3, if desired. In this position, the second heat source 8 is also supported on the inside of the rear wall 6. The second heat source 8 is supported with its frame 17 surrounding the front- or heat-emission side. As in the above-described over-center position of the second heat source 8 for heat emission in the horizontal direction, in which it is not arranged exactly parallel to the rear wall 6, the second heat source 8 is also positioned not strictly parallel to the plane of the grilling surface 7, in its position as a top burner in its heat-emission side, due to its support on the rear wall 6. Thus, in the example embodiment shown in the figures, an additional fixing means for retaining the second heat source 8 in this position is also not necessary in this position of the second heat source 8. This would be necessary if the second heat source is to be retained in an intermediate position between the two end positions shown in FIGS. 2 and 3. Due to the clamping mechanism for fixing the second heat source 8 at its height relative to the grilling surface 7, the height can be adjusted infinitely.

The second heat source 8 can be operated simultaneously with one or more burner tubes below the grilling surface 7.

The grilling appliance 1 has a hood, not shown in the figures, with which the cooking space located above the grilling surface 7 can be covered. This is possible regardless of the position of the second heat source 8.

The adjustability of a second heat source 8.1 is described in the following figures. As in the previously described example embodiment, identical components, to the extent necessary, are identified by the same reference numerals, supplemented by a suffix.

Figure 4:
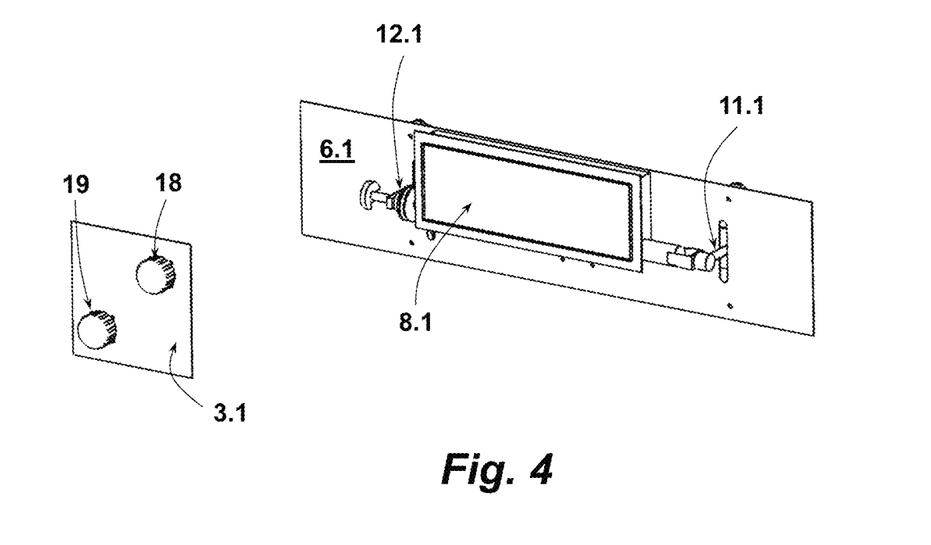
FIG. 4 shows a perspective partial view of parts of a further grilling appliance, shown only with a section of its rear wall and a second heat source located in front of it, as well as with a section of its control panel.
Figure 5:
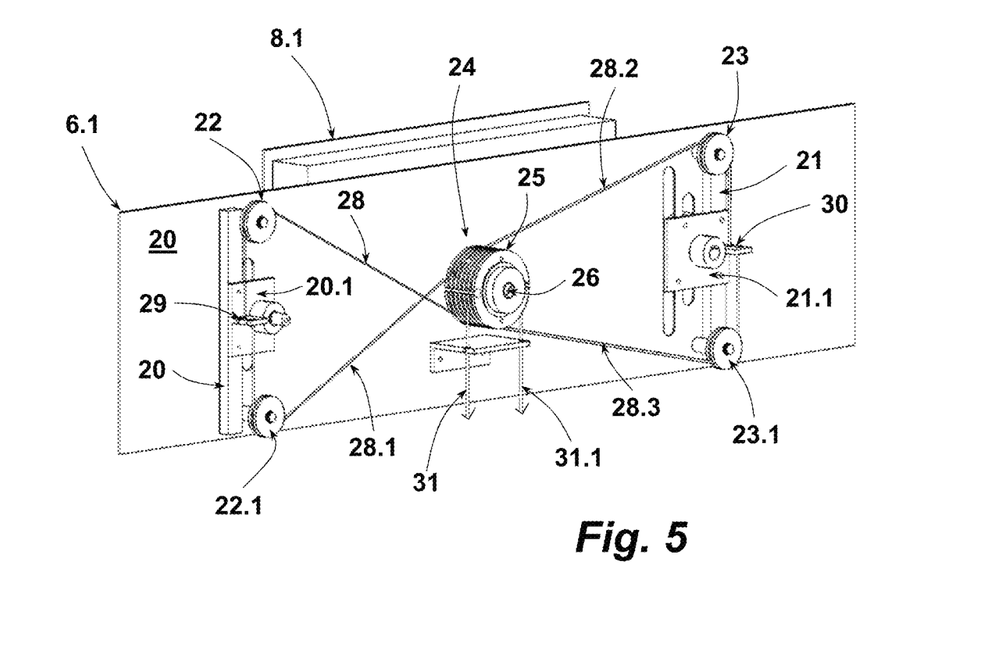
FIG. 5 shows a rear-side view to show the suspension of the second heat source on the rear wall.
Figure 6:
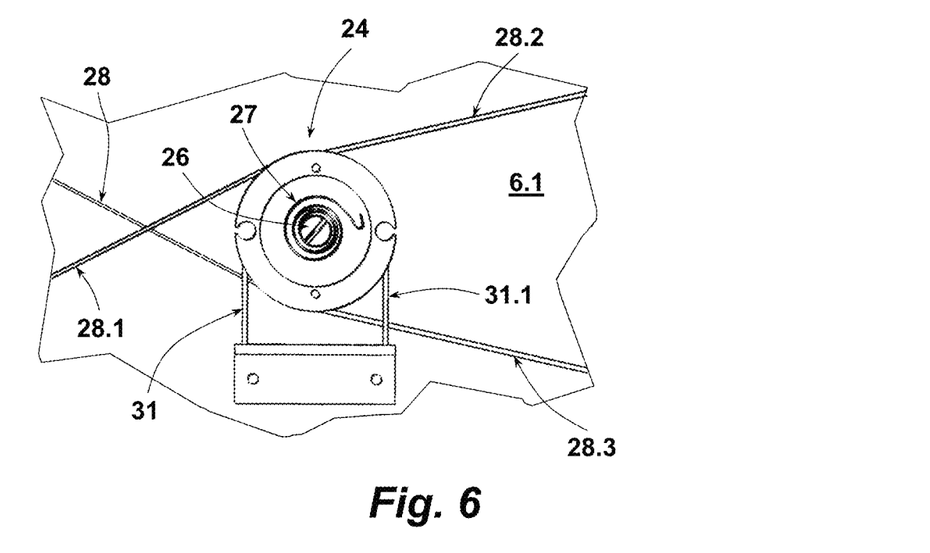
FIG. 6 shows a detailed view of the suspension of the second heat source.
Figure 7:
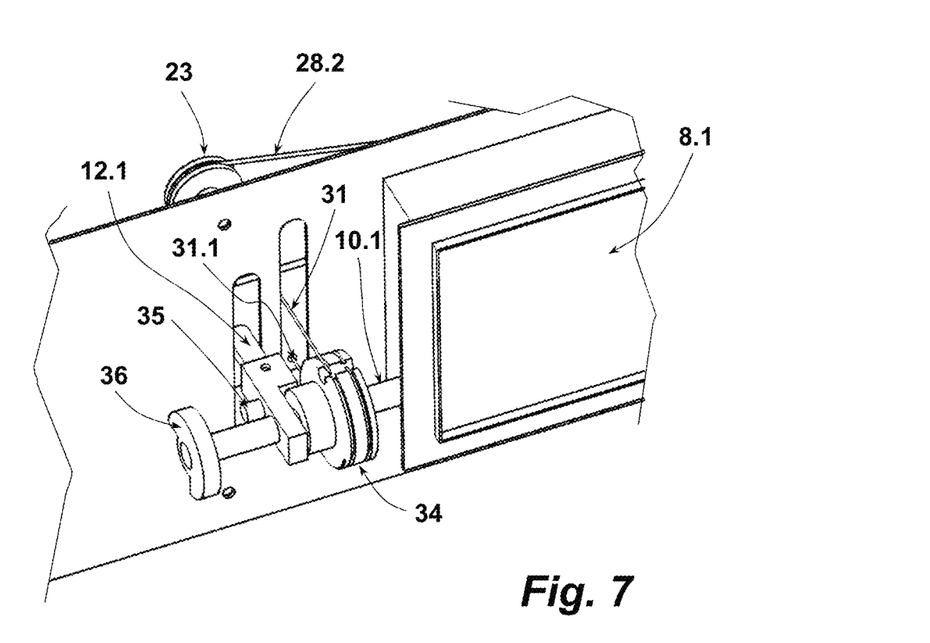
FIG. 7 shows a perspective detailed view of the left edge section of the second heat source shown in FIG. 4, in order to show an actuator for the pivotability thereof.
Figure 8:
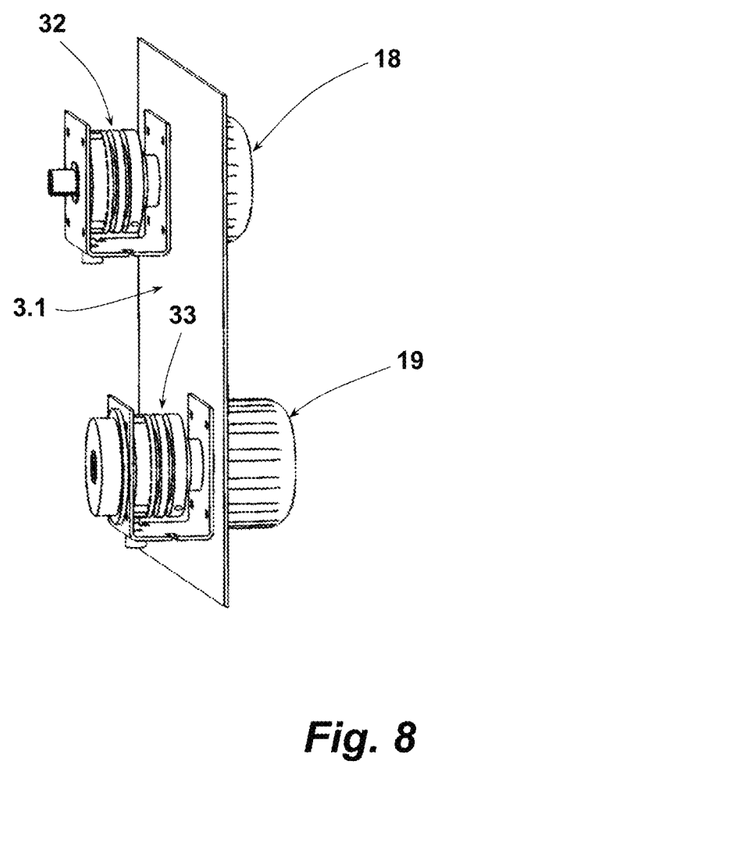
FIG. 8 shows a perspective rear-side view of the section of the control panel from FIG. 4, with two manually operated control elements, provided for the height adjustment and the pivotability of the second heat source.

With regard to the adjustability of a second heat source 8.1, which is designed in principle like the second heat source 8 described in the previous example embodiment, an adjustability of same is explained in FIGS. 4 to 8 with the aid of a further example embodiment. With its two positioning arms 11.1, 12.1, the second heat source 8.1 extends through the section of the rear wall 6.1 of a grill appliance, as shown in FIG. 4, which is otherwise not shown in detail. Also shown is a section of the control panel of the front wall 3.1 of this grilling appliance. Two rotary knobs 18, 19 are arranged in this part of the control panel. Rotary knob 18 is used to adjust the height of the second heat source 8.1. Rotary knob 19 is used to pivot the heat source 8.1.

With its two positioning arms 11.1, 12.1, the heat source 8.1 is guided in a respective guide 20, 21 arranged on the rear side 20 of the rear wall 6.1 so as to be translationally adjustable in the vertical direction. The guides 20, 21 are only shown schematically. The respective connecting links of the positioning arms 11.1, 12.1 that engage in the respective guide rails 20, 21 are each retained on a guide plate 20.1, 21.1. Adjacent the guide rails 20, 21, two deflection rollers 22, 22.1, 23, 23.1 are connected to the rear wall 6.1. The deflection rollers 22, 22.1 or 23, 23.1 assigned to each of the guide rails 20 or 21 are spaced apart from one another in the vertical direction and are located in the end area of the respective guide rail 20 or 21. The respective guide plate 20.1, 21.1 is located between the two deflection rollers 22, 22.1 or 23, 23.1. A cable pulley 24 is attached to the rear wall 6.1 between the two guide rails 20, 21. The cable pulley 24 comprises a spring housing 25 which is rotatable about an axis 26 in both directions. A spiral spring 27 sits inside the spring housing 25 (see FIG. 6). It is pretensioned within the spring housing 25 relative to the axis 26, specifically in order to provide a counterforce with respect to the weight of the second heat source 8.1. The spring housing 25 has cable guide grooves in its outer surface. In the example embodiment shown, a cable is anchored in each cable guide groove. A first cable 28, which is connected with its one end to the spring housing 25, is guided via the deflection roller 22 and is connected with its other end to a carrier 29 located on the guide plate 20.1. A second cable 28.1 is connected in the same way to the spring housing 25 of the cable pulley 24 and is also connected to the carrier 29 with its other end. The two cables 28, 28.1 are connected to the cable pulley 24 in opposite directions with respect to the direction of rotation of the spring housing 25. If the cable pulley 24 or its spring housing 25 is rotated clockwise, for example, cable 28 is unwound from the cable pulley 24 according to the amount of rotation, while cable 28.1 is wound onto the cable pulley 24 at the same time. Since the ends of the cables 28, 28.1 are connected to the carrier 29 with positive fit in the pulling direction, the guide plate 20.1 is moved up or down by means of a corresponding rotation of the spring housing 25. A clockwise rotation of the spring housing 25 causes a lowering of the second heat source 8.1, while a rotary movement of the spring housing 25 in the opposite direction causes it to be raised.

In the same way, two cables 28.2, 28.3 are connected both to the cable pulley 24 and to a carrier 30 of the guide plate 21.1.

The spring force provided by the spiral spring 27 is designed so that the second heat source 8.1 is retained in every position. The second heat source 8.1 is suspended in a weight-compensated manner by the counterforce of the cable pulley 24.

Two actuating cables 31, 31.1 are also connected to the cable pulley 24, via which, when actuated accordingly, the cable pulley 24 or its spring housing 25 is rotated in one direction or the other, specifically according to the desired translational position of the second heat source 8.1 relative to its height-setting device. The two actuating cables 31, 31.1 are each guided to the actuating button 18 by a Bowden cable in a manner not shown in greater detail. A cable pulley 32 is situated on the shaft of the actuating button 18 (see FIG. 8). The cable pulley 32 has two cable guide grooves, an actuating cable 31 or 31.1 engaging in each of these guide grooves and being connected to this cable pulley 32. If the rotary knob 18 with the cable pulley 32 arranged in a torque-locking manner is rotated in one direction or the other, a tensile force is exerted on one of the two actuating cables 31, 31.1, which then turns the cable pulley 24 in one direction or the other. What is special is that only a small amount of force has to be used to adjust the second heat source 8.1 due to its weight-compensated suspension. This is easily possible with a rotary knob, as described for example with reference to rotary knob 18. In the example embodiment described, the system friction, provided by the cable guides described, serves as the retaining means for fixing the second heat source 8.1 at the desired height. It should be noted here that the actuating cables 31, 31.1 are designed as Bowden cables and thus a certain static friction between these cables 31, 31.1 and the inner wall of the casing surrounding them must be overcome in order to adjust them. The design of the guides on the rear side 20 of the rear wall 6.1, for example, also has an influence on the system friction.

The pivotability of the second heat source 8.1 takes place in an analogous manner. A pivotability of the second heat source 8.1 takes place with the participation of a positioning-force-reducing moment of force. The rotary knob 19 used for the pivot adjustment of the second heat source 8.1 carries a spiral spring in addition to a cable pulley 33, so that cable pulley 33 is ultimately constructed in a similar way to cable pulley 24. The spiral spring is pretensioned to absorb the weight occurring when the second heat source 8.1 is pivoted, to the extent possible. Cables are also used to actuate the pivoting. For this purpose, a cable pulley 34 connected to the second heat source 8.1 is situated on the pivot axis piece 10.1 of the second heat source. The two actuating cables 31, 31.1. connect the two cable pulleys 33, 34 such that a rotary movement of the rotary knob 19 in one direction leads to a pivot movement of the second heat source 8.1, and a rotary movement of the rotary knob 19 in the other direction leads to a pivoting movement in the other direction.

The pivoting movement of the second heat source 8.1 is limited by a stop 35, which is located on the positioning arm 12.1. In the example embodiment shown, the stop 35 is formed by a bolt. This bolt works together with a stop disk 36, which is positioned in a torque-locking manner on the pivot axis piece 10.1. In order to make the stop 35 visible, the stop disk 36 is shown moved away from its actual position immediately adjacent the positioning arm 12.1.

The invention has been described on the basis of example embodiments. Without departing the scope of the claims, further options and modifications result for a person skilled in the art for implementing the invention without having to explain or show them in greater detail in the scope of this disclosure.

LIST OF REFERENCE NUMERALS

1 Gas grilling appliance
2 Substructure
3, 3.1 Front wall
4 Side wall
5 Side wall
6 Back wall
7 Grilling surface
8, 8.1 Second heat source
9 Pivot axis piece
10, 10.1 Pivot axis piece
11, 11.1 Positioning arm
12, 12.1 Positioning arm
13 Guide opening
14 Guide opening
15 Sheet-metal strips
16 Housing
17 Frame
18 Rotary knob
19 Rotary knob
20 Guide rail
20.1 Guide plate
21 Guide rail
21.1 Guide plate
22, 22.1 Deflection roller
23, 23.1 Deflection roller
24 Cable pulley
25 Spring housing
26 Axis
27 Spiral spring
28, 28.1, 28.2, 28.3 Cable
29 Carrier
30 Carrier
31.1 Actuating cable
32 Cable pulley
33 Cable pulley
34 Cable pulley
35 Stop
36 Stop disc
S Pivot axis

The invention claimed is:

1. A grilling appliance comprising:
a grilling surface for placing food to be cooked,
a first heat source located below the grilling surface for heating food on the grilling surface, and
a second heat source located above the grilling surface,
wherein the second heat source is retained in a translationally height-adjustable manner on a rear wall of the grilling appliance extending beyond the top of the grilling surface, and
the second heat source is pivotable about a pivot axis in order to adjust the direction of the desired heat radiation between an operating position for lateral heat emission in a horizontal direction to heat food located on the grilling surface or on a spit rotisserie from the side, and an operating position for downward heat emission in a vertical direction to heat food located on the grilling surface from the top, and thus the second heat source being pivotable about the pivot axis to provide a pivoting movement from an upright position for heating food located on the grilling surface from the side to a horizontal position to heat food located on the grilling surface from the top.

2. The grilling appliance of claim 1, wherein the pivot axis is arranged offset off-center in relation to the second heat source at a lower end of the second heat source when the second heat source is in its position for lateral heat emission.

3. The grilling appliance of claim 1, wherein the second heat source acts in relation to its pivotability in its two end positions against a stop, through which the second heat source is retained in a stable position.

4. The grilling appliance of claim 3, wherein the second heat source is supported in its position for lateral heat emission in relation to the pivot axis, in an over-center position and in the direction of the rear wall of the grilling appliance.

5. The grilling appliance of claim 1, wherein the second heat source is provided as an IR radiator operated by fuel gas.

6. The grilling appliance of claim 5, wherein the gas is supplied to the IR radiator via a piece of pipe, and the IR radiator is pivotable with respect to the piece of pipe.

7. The grilling appliance of claim 1, wherein, for height adjustment of the second heat source, the rear wall has two spaced-apart, vertically-extending guide openings, the second heat source is connected to two positioning arms which extend through the guide openings, and means for retaining the second heat source with regard to its height adjustability are provided outside the cooking space enclosed by the grilling surface and the rear wall.

8. The grilling appliance of claim 7, wherein the positioning arms are each guided into a guide arranged on the rear side of the rear wall for vertical adjustability, and a counterforce that compensates for weight of the second heat source acts on the positioning arms.

9. The grilling appliance of claim 8, wherein the second heat source remains in a height-adjusted position in its guidance and/or in the force transmission of the weight-compensating counterforce due to system friction.

10. The grilling appliance of claim 8, wherein the counterforce is provided by at least one spiral spring, the weight-compensating force of which is transmitted to the positioning arms via cables.

11. The grilling appliance of claim 10, wherein the at least one spiral spring sits in a spring housing designed as a cable pulley, the cables transferring the counterforce to the positioning arms are connected to the cable pulley, an outer surface of the spring housing has cable guide grooves for guiding the cables connected to the positioning arms, and an actuator for turning the cable pulley is connected to the cable pulley in order to adjust the height of the second heat source.

12. The grilling appliance of claim 11, wherein the actuator is a manually operable control element arranged on a user control side of the grilling appliance, and adjustment movement of the manually operable control element is transmitted to the cable pulley via cables.

13. The grilling appliance of claim 1, wherein a positioning-force-reducing moment of force acts on the second heat source in relation to its pivotability.

14. The grilling appliance of claim 13, wherein the positioning-force-reducing moment of force is provided by at least one spring element, the moment of force of which is transmitted to the second heat source via at least one cable.

15. The grilling appliance of claim 1, wherein the first heat source is a heat source operated by fuel gas.

16. The grilling appliance of claim 1, wherein the second heat source is pivotably adjustable into an intermediate position between the upright position and the horizontal position, the intermediate position being an operating position with the direction of the desired heat radiation provided at an angle between the horizontal direction and the vertical direction.

* * * * *